United States Patent [19]

Hurner

[11] Patent Number: 4,522,167
[45] Date of Patent: Jun. 11, 1985

[54] LUBRICATING OIL MONITOR

[76] Inventor: Erwin E. Hurner, 2605 S. Rivershore, Moorhead, Minn. 56560

[21] Appl. No.: 561,739

[22] Filed: Dec. 15, 1983

Related U.S. Application Data

[63] Continuation-in-part of Ser. No. 218,918, Dec. 22, 1980, Pat. No. 4,421,078, which is a continuation-in-part of Ser. No. 192,077, Sep. 29, 1980, abandoned.

[51] Int. Cl.$^3$ .............................................. F01M 11/12
[52] U.S. Cl. ............................ 123/196 S; 123/196 R; 184/103 R
[58] Field of Search ........................ 123/196 R, 196 S; 184/6.4, 103 R, 105 R

[56] References Cited

U.S. PATENT DOCUMENTS

| | | | |
|---|---|---|---|
| 1,613,245 | 1/1927 | Nelson | 184/103 R |
| 2,564,230 | 8/1951 | Pitney | 184/103 R |
| 3,712,420 | 1/1973 | Pelizzoni et al. | 184/103 R |
| 3,983,958 | 10/1976 | Swearingen | 184/103 R |
| 4,091,895 | 5/1978 | Lang | 184/103 R |

*Primary Examiner*—E. Rollins Cross
*Attorney, Agent, or Firm*—Bailey & Hardaway

[57] ABSTRACT

An apparatus which has the means to facilitate maintenance of appropriate lubricating oil levels within the engine of a vehicle.

9 Claims, 3 Drawing Figures

LUBRICATING OIL MONITOR

CROSS REFERENCE TO RELATED APPLICATIONS

This application is a continuation-in-part of application Ser. No. 218,918 now U.S. Pat. No. 4,421,078, filed Dec. 22, 1980 which in turn is a continuation-in-part of application Ser. No. 192,077 now abandoned, filed Sept. 29, 1980. Additionally, this application incorporates subject matter in my application filed of even date herewith entitled Engine Detecting Device identified as Ser. No. 561,839, filed on 12/15/83.

BACKGROUND OF THE INVENTION

This invention relates generally to the art of internal combustion engines and more particularly to the maintenance of lubricating oil in such engines.

The ultimate lifetime maintenance and extraordinary maintenance associated with vehicles driven by internal combuston engines is to a large extent determined by the maintenance of appropriate coolant and lubricant levels within the engines of such vehicles. These costs can be particularly exaggerated in diesel driven trucks, and in fleet operations such costs are multiplied by the number of trucks in the fleet. As is well known the life of a diesel engine is to a large extent determined and even extended by appropriate maintenancing; particularly the maintenance of oil lubricant at appropriate levels.

While owner operators of diesel trucks have a large financial incentive in maintaining appropriate lubricant levels within the vehicle during operation, such incentives do not always exist with the hired driver. Even owner operators, however, frequently overlook maintenance of appropriate lubricant level in the mistaken hast of maintaining delivery schedules. All such neglect is to the detriment of the life expectancy of the diesel engine.

SUMMARY OF THE INVENTION

It is thus an object of this invention to provide an apparatus to facilitate maintenance of appropriate lubricating oil levels within a vehicle.

It is particularly an object of this invention to provide such an apparatus which is useful for the maintenance of appropriate lubricating oil levels in large diesel operated trucks wherein such maintenance is particularly cost effective.

These as well as other objects are accomplished by an apparatus which is attached to an internal combustion engine to monitor lubricating oil levels. The apparatus comprises an elongated chamber which communicates with the oil pan of the engines and with the gaseous atmosphere of the lubrication system and provides means for detecting the oil level within the chamber.

DETAILED DESCRIPTION

In accordance with this invention it has been found that an apparatus may be provided to readily adapt the oil pan of a vehicle with a lubricating monitoring apparatus to greatly facilitate the monitoring of levels therein. The monitoring of the levels therein is particularly directed to the type of monitor described in the parent application of which this application is a continuation-in-part and of its companion application Ser. No. 401,533, filed July 25, 1983. Additionally the monitoring apparatus of this invention is particularly adaptable for combining with the apparatus of the parent application and also with the companion application filed herewith entitled Engine Detecting Device.

The apparatus of this invention is an attachment to a conventional engine so as to provide communication with the lubricating oil in the oil pan and easy and variable monitoring of the oil levels therein. Various other advantages and feature will become apparent from the following description given with reference to the various figures of drawings.

Figure 1:
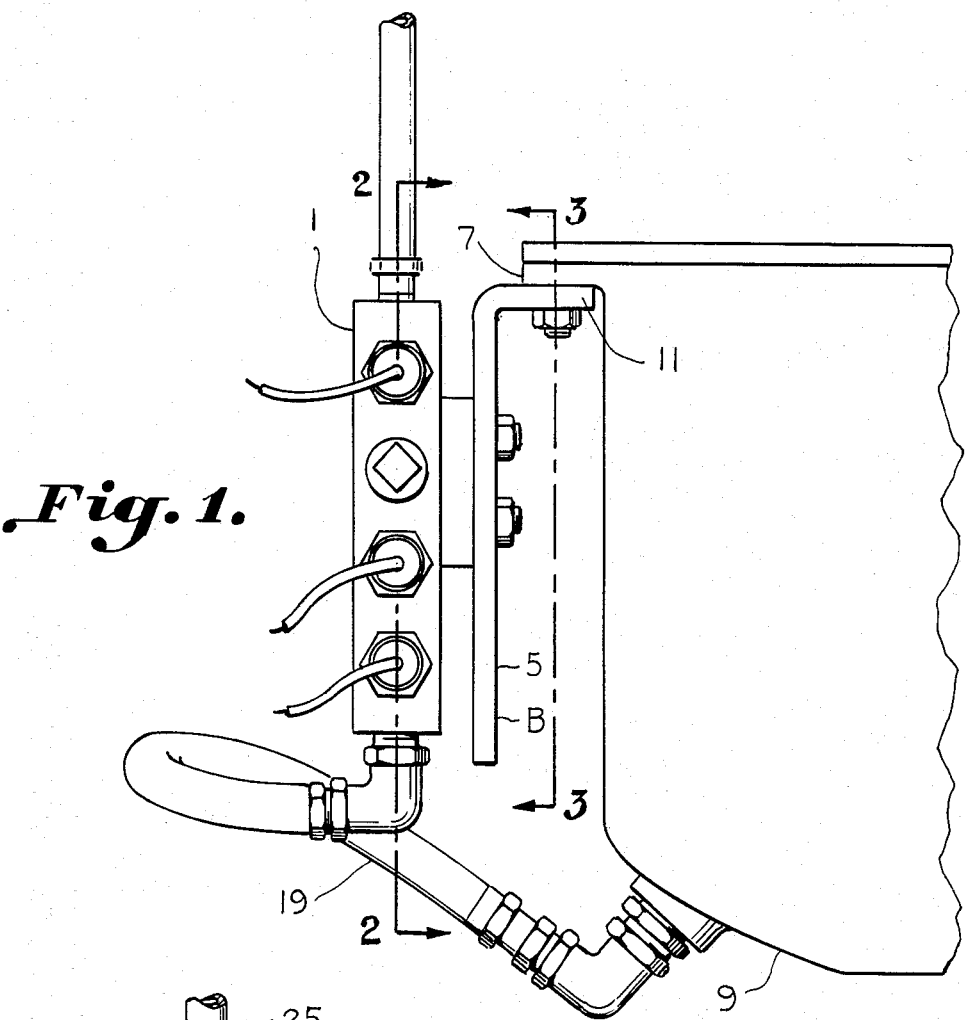
FIG. 1 schematically illustrates the apparatus in accordance with this invention.

FIG. 1 of the drawings illustrates the device in accordance with this invention. The apparatus comprises means 1 defining an elongated monitor chamber. The chamber 3 is illustrated in the cut-away view of FIG. 2. The means 1 defining the chamber are preferably attached by mounting means 5 to a butting flanges 7 on which oil pan 9 is maintained in place. The mounting means preferably comprises a vertically oriented L with the short leg 11 attached to the flange 7 so as to vertically dispose the long leg 13.

Figure 3:
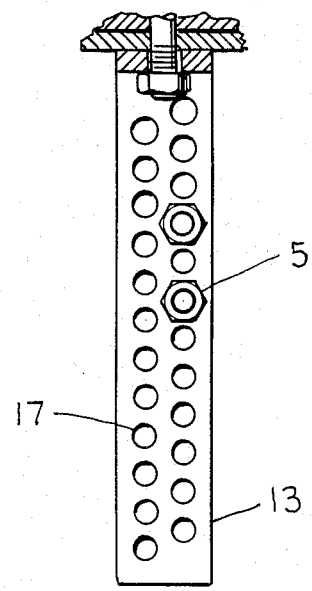
FIG. 3 is a view along the line 3—3 of FIG. 1.

As can be seen best in FIG. 3 of the drawings the mounting means 5 having long leg 13 is vertically oriented with a plurality of adjustable sites 17 for attachment of means defining a chamber. With variable mounting positions, the means defining the monitor chamber 1 may be located at a variety of altitudes along the long leg 13 of mounting means 5.

It is seen that the means 1 defining the chamber 3 communicates with oil pan 9 through means 19 in fluid communication with the interior of oil pan 9.

Figure 2:
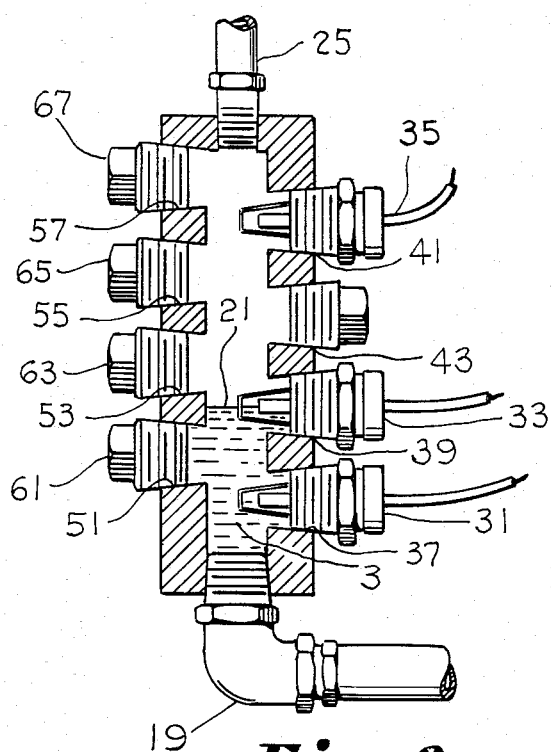
FIG. 2 is a sectional view along the line 2—2 of FIG. 1.

It is seen in FIG. 2 of the drawings that by the fluid communication of means 19 and oil level 21 is maintained within chamber 3. It is preferred to maintain the oil level 21 at an elevation identical to that within the oil pan and for that reason means 25 are provided within the upper part of chamber 3 to communicate with the gaseous atmosphere within the oil lubrication system and to thus provide an equal pressure over the oil within chamber 3 and within oil pan 9 so that the level 21 is substantially identical to the level within oil pan 9.

As best illustrated in FIG. 2, a variety of detection probes 31, 33 and 35 are illustrated as mounted on the right hand side of the FIG. 2 view. The means for detecting 31, 33 and 35 are mounted within ports 37, 39 and 41. Such means are described in the parent application hereto and its counterpart.

It is seen that the left hand side of chamber 3 has an additional plurality of ports 51, 53, 55 and 57.

The ports on the left hand side are preferably offset from ports on the right hand side in order to provide an exacting variety verticle placement sites for the probes.

The left hand side of chamber 3 as illustrated in FIG. 2 communicates with a plurality of plugs 61, 63, 65 and 67 which serves only the purpose of closing the chamber 3 to the outside atmosphere. It is understood however that any additional oil monitors may be mounted in the ports which are illustrated as being filled by plugs.

As examples of the types of detecting devices which are illustrated in FIG. 2, detecting means 31 detects a dangerously low oil level which may be utilized to warn the driver by means described in the parent application hereof. The detecting device 33 may detect a desired oil level and may activate oil addition means when the oil falls below that level during operation of the engine. The detecting means 35 may be utilized to detect a cold oil level as is best described in the application filed simultaneous herewith and entitled Engined Detecting Device.

It is thus seen that the apparatus in accordance with this invention greatly facilitate s the monitoring of lubricating oil levels and the subsequence maintance of an appropriate oil level. As many variations of the above description which is exemplary in nature will become apparent to those that are skilled in the art, such variations are within the scope of this invention as defined by the following appended claims.

What is claimed is:

1. An apparatus for attachment to an internal combustion engine to monitor lubricating oil levels within an oil pan of a lubrication system thereof comprising;

means defining an elongated monitoring chamber, said chamber having a bottom and said means further defining on either said thereof a plurality of ports communicating with said chamber, said ports on one side being offset vertically from the ports on the other side thereof;

means for mounting said elongated chamber in a vertical orientation;

means in fluid communication between the bottom of said chamber and said oil pan;

means communicating with an upper part of said chamber and said lubrication system for equalizing gaseous pressure above oil in said chamber and said lubrication system;

means for detecting presence or absence of oil at a level within said chamber.

2. The apparatus according to claim 1 wherein said means for mounting comprises an L shaped bracket having a short leg and a long leg, the short leg of said L shaped bracket adapted for attachment to a flange of an oil pan to thereby vertically dispose the long leg of said L, said long leg defining adjustable sites for attachment of said means defining an elongated chamber thereto at various levels.

3. The apparatus according to claim 1 comprising a plurality of means for detecting the presence or absence of oil communicating with said chamber.

4. The apparatus according to claim 1 comprising means for adding fresh lubricating oil to said chamber.

5. The apparatus according to claim 1 wherein said means for equalizing gaseous pressure communicates with a PCV valve of said lubrication system.

6. The apparatus according to claim 1 wherein said offset is $\frac{3}{8}$ of an inch.

7. The apparatus according to claim 1 wherein said means for detecting are mounted in appropriate ports for detecting levels therein.

8. The apparatus according to claim 1 wherein said means for adding communicates with said chamber through one of said ports.

9. The apparatus according to claim 1 wherein one of said ports receive said means for detecting and said means for detecting a dangerously low oil level and further comprising means for detecting a desired oil level for a verticle elevation above said means for detecting a dangerously low oil level to activate means for adding and futher comprising means for detecting a desired cold oil level communicating with indication means located exteriorly of the engine compartment to permit remote detecting of a low oil level.

* * * * *